United States Patent

Brüggendick et al.

[11] Patent Number: 5,810,206
[45] Date of Patent: Sep. 22, 1998

[54] DEVICE FOR MEASURED REMOVAL OF FLOWABLE MATERIAL

[75] Inventors: Hermann Brüggendick, Schermbeck; Horst Bialowons, Wolferheim, both of Germany

[73] Assignee: Steag Aktiengesellschaft, Essen, Germany

[21] Appl. No.: 732,402

[22] PCT Filed: Apr. 13, 1995

[86] PCT No.: PCT/EP95/01401

§ 371 Date: Feb. 27, 1997

§ 102(e) Date: Feb. 27, 1997

[87] PCT Pub. No.: WO95/29114

PCT Pub. Date: Nov. 2, 1995

[30] Foreign Application Priority Data

Apr. 21, 1994 [DE] Germany .......................... 44 13 864.4

[51] Int. Cl.[6] .................................................. B67D 5/52
[52] U.S. Cl. ...................... 222/145.5; 222/142; 222/460; 222/252
[58] Field of Search ............................... 222/145.5, 363, 222/368, 460, 275, 278, 142, 138, 252; 141/105, 106

[56] References Cited

U.S. PATENT DOCUMENTS 1,096,785  5/1914  Jensen ..................................... 222/142
2,743,662  5/1956  Pietrok et al. .

FOREIGN PATENT DOCUMENTS

| 0178005 | 4/1986 | European Pat. Off. . |
| 1546792 | 10/1967 | France . |
| 2225362 | 11/1974 | France . |
| 1026689 | 6/1955 | Germany . |
| 1042471 | 10/1957 | Germany . |
| 1531015 | 7/1969 | Germany . |
| 2203987 | 8/1973 | Germany . |
| 2421983 | 12/1974 | Germany . |
| 4000204 | 7/1991 | Germany . |
| 4179628 | 6/1992 | Japan . |
| 2259910 | 3/1993 | United Kingdom . |

*Primary Examiner*—J. Casimer Jacyna
*Assistant Examiner*—Steven O. Douglas
*Attorney, Agent, or Firm*—Robert W. Becker & Associates

[57] ABSTRACT

An adsorption medium reactor has a plurality of removal hoppers for removing flowable adsorption medium from the reactor. Each one of the removal hoppers has at least one removal opening. A common collecting funnel is arranged below the removal openings of the removal hoppers. The common collecting funnel has a removal device for emptying the common collecting funnel. Each one of the removal openings of the removal hoppers is slot-shaped and has two parallel-extending limiting edges. A rotary gate with at least one gate chamber is arranged below each one of the removal openings. The rotary gate is limited by a substantially cylindrical circumferential wall. The cylindrical circumferential wall has a plurality of inlet/outlet openings adapted to a cross-section of the corresponding removal opening. The inlet/outlet openings are arranged in a row axially adjacent to one another parallel to an axis of rotation of the rotary gate. The rotary gate is arranged such and a size of the cylindrical circumferential wall is selected such that all of the inlet/outlet openings arranged in a row communicate in one rotary position with the corresponding removal opening and in at least one other rotary position allow for emptying of the bulk material from the gate chamber under the force of gravity. In at least one other position the removal opening is closed off by the circumferential wall forming a closure body.

9 Claims, 2 Drawing Sheets

DEVICE FOR MEASURED REMOVAL OF FLOWABLE MATERIAL

BACKGROUND OF THE INVENTION

The invention relates to an adsorption medium reactor with a plurality of removal hoppers for removal of flowable adsorption medium (bulk material) from the reactor whereby each removal hopper has at least one removal opening and whereby below the removal openings of a plurality of removal hoppers a common collecting funnel is arranged which for its emptying is provided with its own removal device.

In a device known from German Patent 40 00 204 of the aforementioned kind the bulk material is deposited on a horizontal intermediate storage floor below a plurality of removal openings. A pivotably suspended removal rake, suspended from a swinging parallelogram structure so as to pivot across the horizontal intermediate storage floor, engages the space below the removal openings and displaces the bulk material collected beneath the removal openings into a lateral removal opening. Accordingly, a relatively large amount of loaded adsorption medium particles are removed over extended operating time periods without requiring servicing. For reduced removal amounts, a limited operating time period, and less aggressive bulk material, the considerable advantages of the swinging removal rake remain partly unused so that the investment expenditure can be too high. This is especially true, for example, for adsorption medium reactors of small cremating devices which, in practice, are used only in single layer operation and require a comparatively minimal adsorption medium removal.

The invention therefore has as an object to provide an especially simple and inexpensively designed removal device which operates with a high degree of reliability, at least for less aggressive bulk material.

SUMMARY OF THE INVENTION

This object is solved with a device of the aforementioned kind according to the invention by:

embodying the removal opening of the removal hoppers in a slot-shaped manner and by providing two parallel limiting edges;

arranging within the removal openings a respective rotary gate with at least one gate chamber which is delimited by a substantially cylindrical circumferential wall;

providing the cylindrical circumferential wall with at least one inlet/outlet opening adapted to the cross-section of the removal opening; and selecting the arrangement of the rotary gate and the dimensions of its cylindrical circumferential wall such that the inlet/outlet opening communicates in one rotational position with the removal opening and in at least one other rotary position allows for removal of the bulk material from the gate chamber by the force of gravity whereby in the latter position the hopper-removal opening is closed off by the circumferential wall of the rotary gate which acts as a closure body.

The adsorption medium reactor according to the present invention is primarily characterized by:

a plurality of removal hoppers for removing flowable adsorption medium from the reactor;

each one of the removal hoppers having at least one removal opening;

a common collecting funnel arranged below the removal openings of the removal hoppers;

the common collecting funnel having a removal device for emptying the common collecting funnel;

each one of the removal openings of the removal hoppers being slot-shaped and comprising two parallel-extending limiting edges;

a rotary gate with at least one gate chamber arranged below each one of the removal openings;

the rotary gate being limited by a substantially cylindrical circumferential wall;

the cylindrical circumferential wall having a plurality of inlet/outlet openings adapted to a cross-section of the corresponding removal opening;

the inlet/outlet openings arranged in a row axially adjacent to one another parallel to an axis of rotation of the rotary gate;

wherein the rotary gate is arranged such and a size of the cylindrical circumferential wall is selected such that all of the inlet/outlet openings. arranged in a row communicate in one rotary position with the corresponding removal opening and in at least one other rotary position allow for emptying of the bulk material from the gate chamber under the force of gravity; and wherein in the at least one other position the removal opening is closed off by the circumferential wall forming a closure body.

The gate chamber comprises at least one radially extending disk for dividing the gate chamber into a plurality of cells arranged axially adjacent to one another.

Each one of the inlet/outlet openings arranged in a row has coordinated therewith one of the cells of the gate chamber.

The cylindrical circumferential wall comprises circumferentially extending stabilizing rings arranged with regular spacing at an inner side of the cylindrical circumferential wall.

The reactor may further comprise guide devices, fixedly connected to the removal hoppers, for dividing the removal openings, wherein the guide devices taper in an upward direction and guide the bulk material toward neighboring one of the inlet/outlet openings.

The removal hoppers are arranged adjacent to one another such that the rotary gates have parallel axes of rotation and are arranged in a common plane.

The removal device of the collecting funnel is a worm conveyor.

Each one of the removal hoppers further comprises, on a side which in a rotational direction of the rotary gate is a leading side, a first part-cylindrical wall connected to the slot-shaped removal opening, the part-cylindrical wall surrounding the rotary gate over an angular range which corresponds at least to an angular range of the inlet/outlet openings of the rotary gate.

Each one of the removal hoppers further comprises a second part-cylindrical wall connected to the slot-shaped removal opening at a side thereof opposite the leading side, wherein the first and the second part-cylindrical walls surround the rotary gate such that between the first and the second part-cylindrical walls an opening of a width of the inlet/outlet openings of the rotary gate remains.

When the gate chamber communicates with the removal opening, a certain amount of bulk material defined by the circumference of the rotary gate is removed through the removal opening into the gate chamber. This amount of bulk material corresponds, with the exception of small empty spaces above the formed slope angle of the collected bulk mateiral, to the receiving volume of the gate chamber. The filling of the gate chamber is practically independent of time, since the time required for completely filling the gate chamber is very short and the filling volume does not change afterward. As soon as the gate chamber is rotated into its removal position, the hopper removal opening is reliably closed off. For the rotary drive and its control it is possible to use simply and inexpensive components.

It is must be taken into consideration that rotary gates are known, in principle, but in different fields of the art.

For example, British published document 22 59 910 discloses a device for a metered dispensation of pellet-shaped foodstuffs such as nuts, whereby the rotary gate cooperates with doctor blades instead of limiting edges at the removal opening. The device comprises two diametrically opposed depressions allowing for a fast sequential dispensation of the charges. The removal of bulk charges, as required in the operation of adsorption medium reactors, is not possible. The same holds two for a further known device according to U.S. PAT. NO. 27 43, 662 in which the rotary gate has a single groove, that is flat and narrow relative to its circumference, for metering salt in the production of hay bales.

In a further embodiment of the invention it is suggested that the cylindrical circumfernetial wall comprises a plurality of inlet/outlet openings in a row axially adjacent to one another parallel to the axis of rotation of the rotary gate and that all of the inlet/outlet openings in a row communicate in one rotary position with the respective removal opening.

For many application of the device for the operation of an adsorption medium reactor, it is expedient to distribute the removal of flowable material to a plurality of removal openings. For this purpose, in a further embodiment of the invention, it is suggested that the gate chamber is divided by at least one radially extending disk into a plurality of cells arranged axially one after another. The radial disks, in addition to their separating function, also have a support and stabilizing function and thus ensure the cylindrical shape of the circumferential wall.

Expediently, each inlet/outlet opening, arranged in a row, has coordinated therewith one cell of the gate chamber.

Advantageously, at the interior of the cylindrical circumferential wall of the gate chamber circumferential stabilizing rings are arranged with regular spacing.

According to another advantageous feature the removal opening of the removal hopper is interrupted by funnel-secured guide devices which taper in the upward direction and guide the bulk material in direction of the neighboring inlet/outlet openings.

It is furthermore advantageous that the removal hoppers are arranged adjacent to one another such that the rotary gates coordinated therewith have parallel axes of rotation and are preferably arranged in a common plane.

Advantageously, the removal device of the collecting funnel is in the form of a worm conveyor.

In another important embodiment of the invention, it is suggested that at the slot-shaped removal openings of each removal hopper, at least on the side which in the rotary direction of the corresponding rotary gate is the leading side, a part-cylindrical wall is provided which surrounds the rotary gate within an angular range corresponding at least to the angular range of the inlet/outlet opening of the rotary gate. This prevents that the rotary gate, when it is moved away from its filling position, provides via its inlet/outlet opening a connection between the removal opening of the corresponding removal hopper and the collecting funnel via which connection the bulk material could flow until the circumferential wall of the rotary gate again completely closes the removal opening.

It has been shown to be especially advantageous in this context that at the slot-shaped removal opening of each removal hopper at both sides part-cylindrical walls are provided which surround the corresponding rotary gate to such an extent that between them an opening remains having the width of the inlet/outlet opening of the rotary gate.

BRIEF DESCRIPTION OF THE DRAWINGS

In the following, the invention will be disclosed in more detail with the aid of the embodiments represented in the drawing. The drawing shows in.

DESCRIPTION OF PREFERRED EMBODIMENTS

Figure 1:
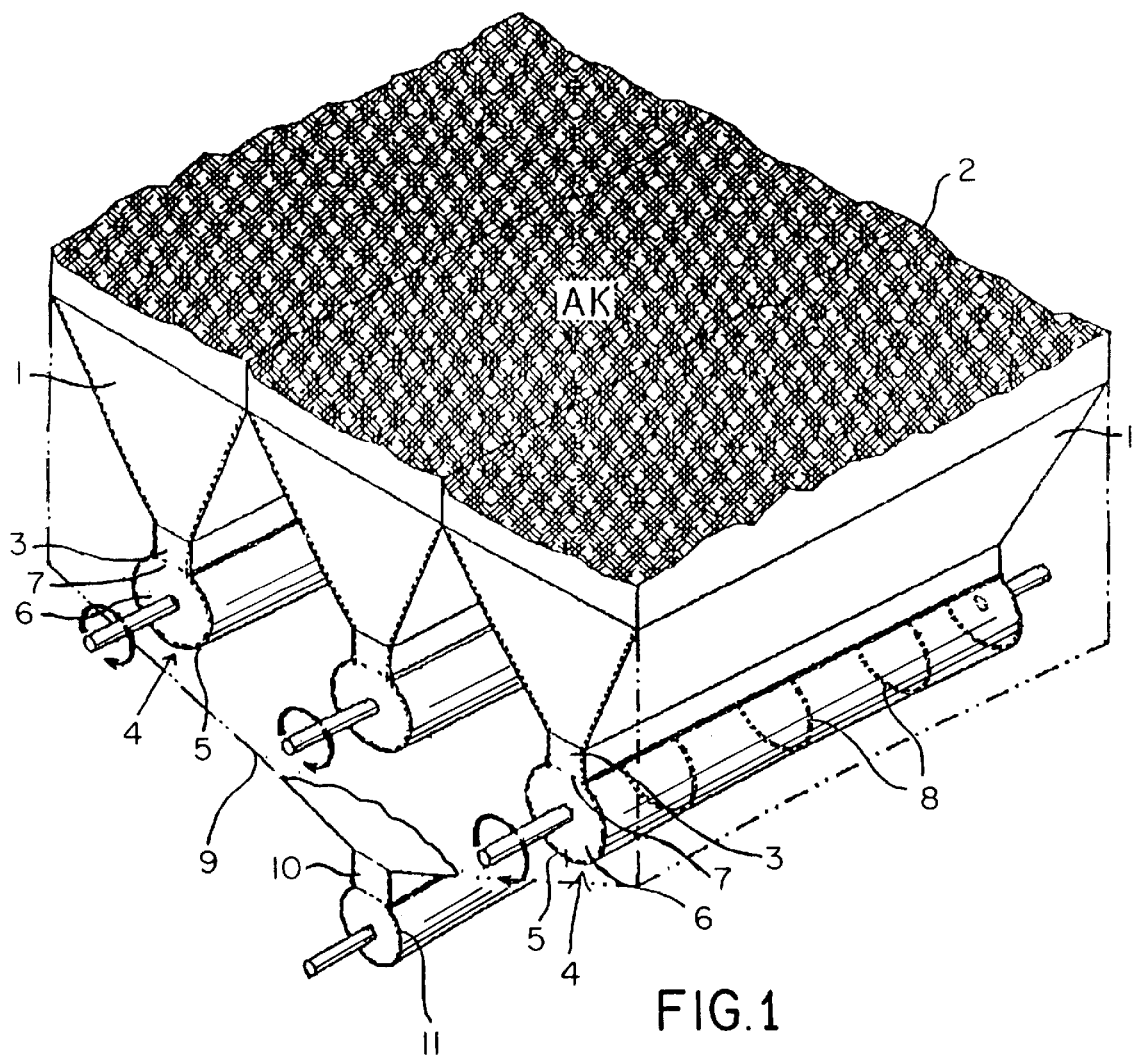
FIG. 1 a perspective schematic representation of the lower portion of an absorption medium reactor with a removal device according to the invention.

According to FIG. 1 the adsorption medium reactor at its lower portion is comprised of three parallel-extending, adjacently arranged removal hoppers 1 across which a layer of adsorption medium 2 is deposited. The removal hoppers have a rectangular cross-section and at their underside are provided with a respective slot-shaped removal opening 3 extending over their entire length.

Below each removal opening 3 there is centrally arranged a rotary gate 4, the cylindrical circumferential wall 5 of which delimits the gate chamber 6. The cylindrical circumferential wall 5 provides an inlet/outlet opening 7 adapted to the cross-section of the removal opening 3 of the removal hopper 1 which extends slot-shaped in the direction of the axis of rotation of the rotary gate. At the inner side of the circumferential wall 5 of the gate chamber 6 stabilizing rings 8 are provided with regular spacing which increase the mechanical stability of the rotary gate 4. The rotary gate 4 can be rotated about its axis of rotation with the aid of a motor. The three adjacently arranged removal hoppers 1 with their coordinated gate chambers 6 are arranged at a common collecting funnel 9 of a rectangular cross-section having a length that is adapted to the length of the removal hoppers and the gate chambers. At the underside of the collecting funnel 9 a slot-shaped removal opening 10 extends in the longitudinal direction. Below this removal opening a collecting cylinder 11 of a worm conveyor is arranged.

Figure 2A:
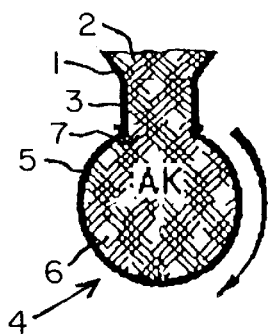
FIG. 2A/B a schematic radial section of a rotary gate and a corresponding removal opening in the metering position, respectively, in the removal position.

For removing of the adsorption medium 2, the three cylindrical rotary gates 4 are rotated into the position represented in FIG. 2A in which their inlet/outlet openings 7 are open in the upward direction and communicate with the corresponding removal openings 3 of the removal hoppers 1. The bulk material flows under the force of gravity into the gate chambers 6 and thus almost instantly fills them whereby only small empty spaces remain above the slope angle formed by the bulk material. After filling, the gate chamber can either be immediately emptied or emptied after a certain time period without more adsorption medium exiting from the removal hopper in the meantime.

Figure 2B:
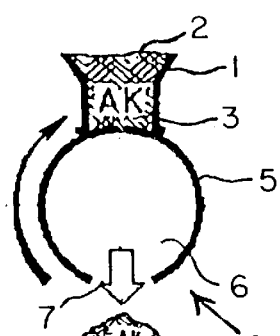

For emptying, the gate chambers 6 are rotated about 180° into the position represented in FIG. 2B whereby the adsorption medium 2 flows under the force of gravity into the collecting funnel 9 while the removal opening of the corresponding removal hopper is closed by the circumferential wall 5. The collecting funnel is open in the downward direction and releases the bulk material into the collecting cylinder 11 of the worm conveyor. The latter transports the bulk material to any desired location. Instead of the collecting cylinder it is also possible to provide a rotary gate. In this case, the adsorption medium is removed in the downward direction by rotating the rotary gate by 180°.

Figure 3:
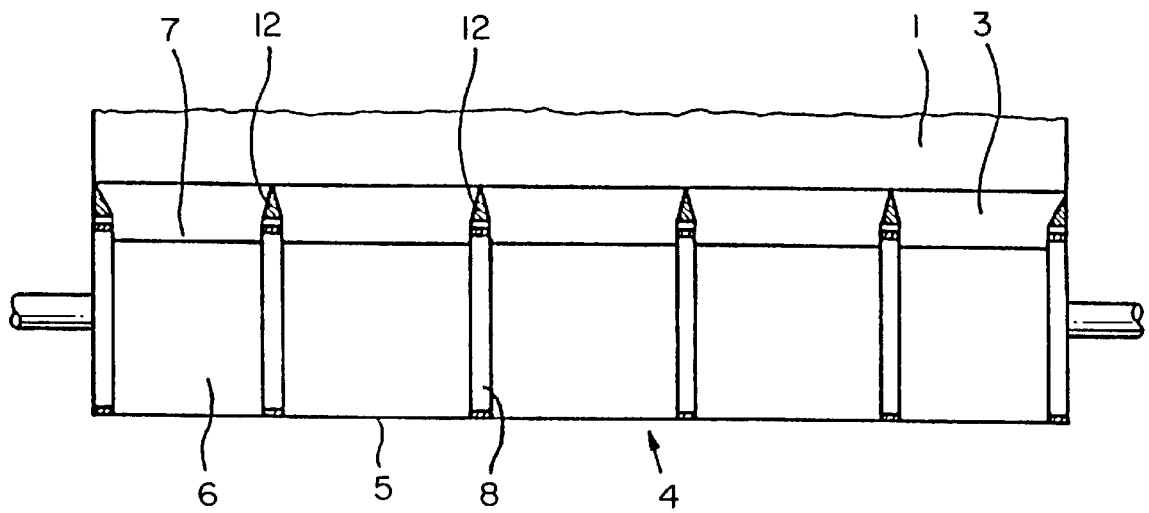
FIG. 3 a schematic axial section of the lower portion of a removal hopper with corresponding rotary gate.

FIG. 3 shows a schematic axial section of the lower portion of the removal hopper 1 with corresponding rotary gate 4. The circumferential wall 5 of the rotary chamber 6 is mechanically reinforced, according to FIG. 1, with a plurality of spaced apart stabilizing rings 8. These stabilizing rings form stays which delimit a row of parallel inlet/outlet openings 7 extending parallel to the axis of rotation of the rotary gate. In the removal opening 3 of the removal hopper 1 guide devices 12 are provided above the stabilizing rings 8 which taper in the upward direction and guide the bulk material in direction of the neighboring inlet/outlet opening 7. In this manner, collection of adsorption medium within the removal openings 3 in the area of the stabilizing rings are prevented and a uniform removal of the bulk material is ensured.

Figure 4:
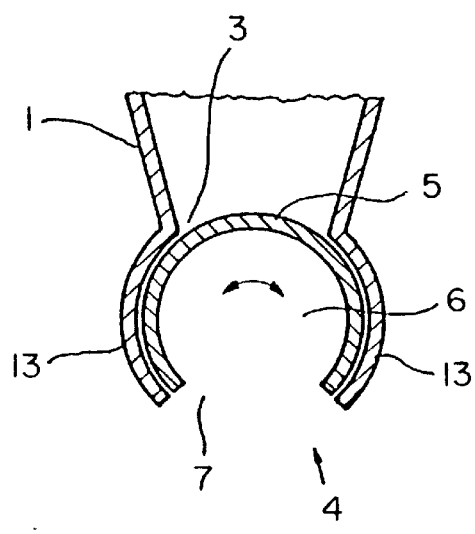
FIG. 4 in a representation corresponding to FIG. 2B a section of a modified rotary gate in the removal position.

In the modified embodiment of the rotary gate 4 according to Fig. 4 a part-cylindrical wall 13 extends adjacent to the slot-shaped removal opening 3 of the removal hopper 1 to both sides. The part-cylindrical walls 13 surround the rotary gate to such an extent that between them an opening of the width of the inlet/outlet opening 7 of the rotary gate remains. In this manner it is prevented that the inlet/outlet opening 7, upon rotation of the rotary gate 4, forms passages at the edges of the removal opening 3 via which the bulk material could flow from the removal hopper 1 directly into the non-represented collecting funnel. This risk would occur especially when the gate chamber 6 begins its rotary movement out of its filling position.

In the context of the invention other numerous variations are possible. Depending on the basic surface area of the bulk material layer, any chosen number of removal hoppers 1 can be arranged adjacent to one another. For collecting the removed bulk material, it is possible to arrange a plurality of planes of removal hoppers 1. In the lowermost plane, the bulk material can either be guided via any selected width directly into a removal opening, or, as disclosed, worm conveyors etc. can be used for a directed transport. Instead of an undivided gate chamber it also possible to provide a divided gate chamber divided by radially extending disks whereby individual cells are provided having at least one corresponding inlet/outlet opening. With the disks the stability of the gate chamber is further increased. Each cell can furthermore have stabilizing rings. As a rotary drive and as a control unit, it is possible to use a common component as well as separate components for the individual rotary gates, whereby they can be operated synchronously or asynchronously.

The present invention is, of course, in no way restricted to the specific disclosure of the specification and drawings, but also encompasses any modifications within the scope of the appended claims.

We claim:

1. An adsorption medium reactor comprising:

a plurality of removal hoppers for removing flowable adsorption medium from said reactor each one of said removal hoppers having at least one removal opening;

a common collecting funnel arranged below said removal openings of said removal hoppers;

said common collecting funnel having a removal device for emptying said common collecting funnel;

each one of said removal openings of said removal hoppers being slot-shaped and comprising two parallel-extending limiting edges;

a rotary gate with at least one gate chamber arranged below each one of said removal openings;

said rotary gate being limited by a substantially cylindrical circumferential wall;

said cylindrical circumferential wall having a plurality of inlet/outlet openings adapted to a cross-section of said corresponding removal opening;

said inlet/outlet openings arranged in a row axially adjacent to one another parallel to an axis of rotation of said rotary gate;

wherein said rotary gate is arranged such and a size of said cylindrical circumferential wall is selected such that all of said inlet/outlet openings arranged in a row communicate in one rotary position with said corresponding removal opening and in at least one other rotary position allow for emptying of the bulk material from said gate chamber under the force of gravity; and wherein in said at least one other position said removal opening is closed off by said circumferential wall forming a closure body.

2. A reactor according to claim 1, wherein said gate chamber comprises at least one radially extending disk for dividing said gate chamber into a plurality of cells arranged axially adjacent to one another.

3. A reactor according to claim 2, wherein each one of said inlet/outlet openings arranged in a row has coordinated therewith one of said cells of said gate chamber.

4. A reactor according to claim 1, wherein said cylindrical circumferential wall comprises circumferentially extending stabilizing rings arranged with regular spacing at an inner side of said cylindrical circumferential wall.

5. A reactor according to claim 1, further comprising guide devices, fixedly connected to said removal hoppers, for dividing said removal openings, wherein said guide devices taper in an upward direction and guide the bulk material toward neighboring one of said inlet/outlet openings.

6. A reactor according to claims 1, wherein said removal hoppers are arranged adjacent to one another such that said rotary gates have parallel axes of rotation and are arranged in a common plane.

7. A reactor according to claim 6, wherein said removal device of said collecting funnel is a worm conveyor.

8. A reactor according to claim 1, wherein each one of said removal hoppers further comprises, on a side which in a rotational direction of said rotary gate is a leading side, a first part-cylindrical wall connected to said slot-shaped removal opening, said part-cylindrical wall surrounding said rotary gate over an angular range which corresponds at least to an angular range of said inlet/outlet openings of said rotary gate.

9. A reactor according to claim 8, wherein each one of said removal hoppers further comprises a second part-cylindrical wall connected to said slot-shaped removal opening at a side thereof opposite said leading side, wherein said first and said second part-cylindrical walls surround said rotary gate such that between said first and said second part-cylindrical walls an opening of a width of said inlet/outlet openings of said rotary gate remains.

* * * * *